March 4, 1941.   J. D. ROSSI   2,233,678
SPREADER FOR PULVERIZED MATERIALS
Filed April 3, 1939
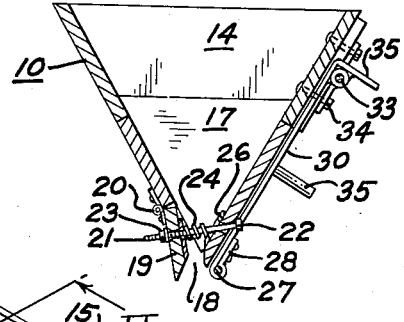
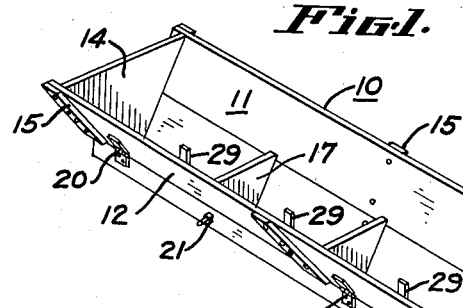
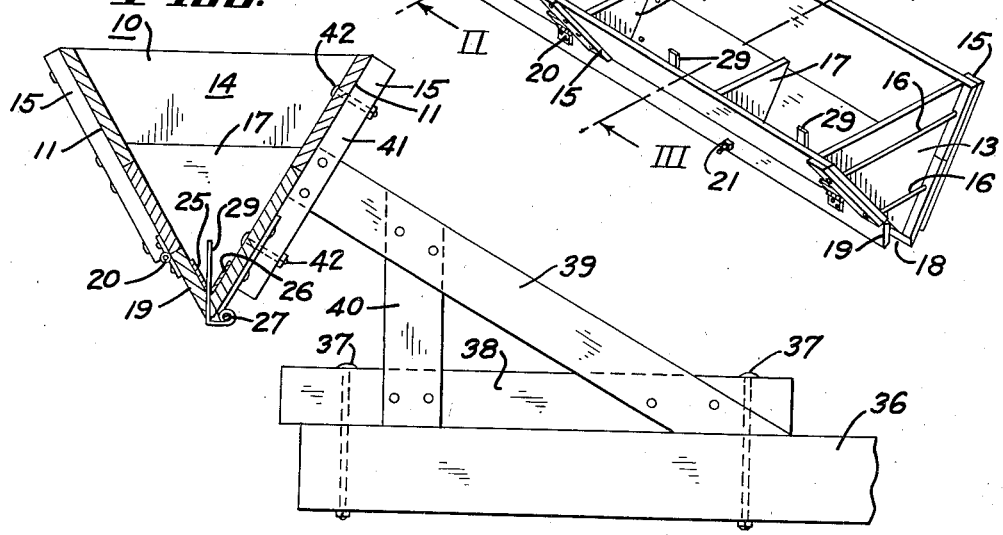
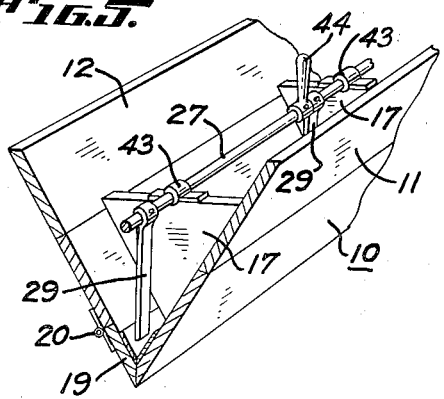
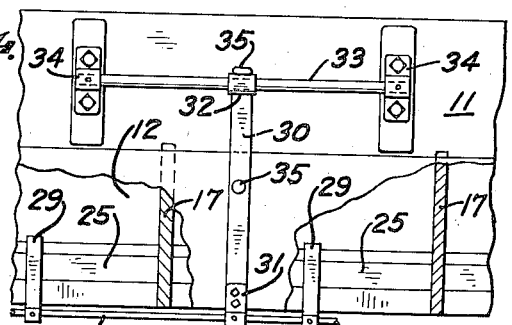
INVENTOR.
JACK D. ROSSI
BY
ATTORNEY.

Patented Mar. 4, 1941

2,233,678

UNITED STATES PATENT OFFICE 2,233,678

SPREADER FOR PULVERIZED MATERIALS

Jack D. Rossi, Lower Lake, Calif.

Application April 3, 1939, Serial No. 265,636

2 Claims. (Cl. 221—120)

This invention relates to spreaders and particularly to the type of spreaders employed in the agricultural industries for fertilizers and the like. It will be readily understood that in the agricultural industries there are large areas of land to be covered by fertilizers and the like, and that it is desirable that the spread of material, regardless of what it shall be, shall be relatively even over the entire area, unless there should be particular spots at which it is predetermined to be desirable to spread a greater or lesser amount than over other areas. Of recent years it has become a well recognized practice to employ chemical fertilizers in powdered or pulverized form, and it has been the practice to spread these powdered, granulated or pulverized fertilized materials by apparatus, many of which include blowers or various types of fan agitators. It has been ascertained, however, that the agitation of these chemical fertilizers causes them to become lumpy, probably as a result of absorption of atmospheric moisture, so that the spread thereof becomes difficult, and uneven over a field. These known types of spreaders are also expensive in initial cost and frequently get out of mechanical order.

Therefore, among the objects of this invention are to provide a spreader which is simple and efficient in operation and economical in production, and from which the fertilizer may be spread evenly in predetermined regulated quantities, even though the terrain should not be level. A further object is to provide a spreader in which it shall not be necessary to agitate the material to be spread, and to provide simple and effective means in such a spreader to break up any lumpy material which may be formed in the fertilizer.

With the foregoing and other objects in view, all of which will be more apparent as this description proceeds, the invention is exemplified in one form in the novel construction and combination of parts hereinafter described, illustrated in the accompanying drawing, and pointed out in the claims hereto appended, it being understood that various changes in the form, proportion, size and details of construction of the apparatus may be resorted to within the scope of the appended claims without departing from the spirit or sacrificing any of the advantages of the invention.

To more clearly comprehend the invention, reference is directed to the accompanying drawing wherein:

Fig. 1 is a perspective of a spreader device of the invention.

Fig. 2 is an enlarged laterally transverse vertical section on line II—II of Fig. 1.

Fig. 3 is an enlarged laterally transverse vertical section on line III—III of Fig. 1, and including a side elevation of a frame support.

Fig. 4 is a fragmentary enlargement of a side view of the spreader with portions broken away to show structure.

Fig. 5 is a fragmentary perspective of a modification of the invention.

Referring to the drawing, in which like characters of reference indicate corresponding parts in the several views, 10 is an elongated hopper or trough generally V-shaped in vertical lateral transverse section in which 11 and 12 indicate the two converging side walls and 13 and 14 indicate the end walls. The walls are preferably made of wood, though it is not intended to limit the structure to any particular type of materials employed. If the side walls 11 and 12 are made of boards, each side may be comprised of a plurality of board strips joined together, edge to edge, by cleats 15, bolted thereto. The end walls may be mounted in the trough in any siutable and well-known manner as by nailing to the side walls or by ordinary screws, and the structure reinforced at its ends by cross-bolts 16 exteriorly of the ends 13, 14. Since it is the purpose to provide a spreader adapted for use over large surface areas, the trough 10 assumes an elongated form, but it is not intended to limit the invention to any particular length. Frequently, it is necessary to employ the spreader on uneven ground, or on a hillside where the angle of inclination of the terrain is substantially parallel to the longitudinal axis of the spreader. Such a condition results from the tilting of the vehicle on which the spreader is transported and would, unless prevented, cause the material to become deposited at one end of the trough while the other end of the trough would be relatively empty, due to the unavoidable vibration of the trough in being propelled over ordinary plowed or cultivated ground. To avoid a shift of a substantial amount of material from one bin to another, baffles or partitions 17 are provided laterally transversely in the trough, in spaced relation to the ends of the trough and to each other. Obviously the geometric form of these baffles will be substantially triangular due to the V-shaped form of the trough.

At the bottom of the V-shaped trough means are included for providing an elongated opening preferably the entire length of the trough. This opening, indicated 18, is controllable and adjustable as to width by means of an elongated gate 19 of equal length therewith. The gate is hinged as at 20 to the lower portion of one of the side walls. The means for controlling and adjusting the gate 19 comprises spaced bolts 21 referred to as gate bolts. These bolts pass through one of the side walls of the trough and through the gate 19, having a head 22 at one end and a threadedly mounted nut 23 at the opposite end. A coil spring 24 is mounted on the shank of the bolt 21, between the respective inner faces of the gate and the opposing side wall. This coil spring is of such a degree of compression that it will urge the gate 19 in an open position but may be further compressed so as to permit the gate 19 to substantially close the opening 18 upon the manipulation of the nut 23. Thus the nut 23 and spring 24 maintain the gate 19 at any predetermined definitely set position. For the protection of the wearing surface at the bottom edges of the side walls 11, 12, due to friction of fertilizer material passing therethrough, there are provided elongated metal strips 25 and 26 at the opening 18.

It will be realized that any material of the types adapted for spreading as fertilizer, whether chemical or otherwise, may sometimes form lumps therein, and there are some types of these fertilizers which pack to some extent, so that constant and even flow through opening 18 would be retarded thereby. Therefore, means are provided to break up any lumps which may form at the opening 18 or to break up a packing of fertilizer which may form in the extreme lower part of the V-shaped trough. In the exemplification of Figs. 1 to 4, this last mentioned means comprises a reciprocable bar 27 slidably mounted in brackets 28 which are secured to the exterior of the side wall 11, which is the wall opposite to which the gate member is mounted. Fixedly secured to the reciprocable bar 27 are blades 29 which extend from said bar through the opening 18 and upwardly into the bottom portion of the V-shaped trough. These blades are relatively thin so as not to interfere with the substantial closing of opening 18 by gate 19, but the thickness of the blades has been somewhat exaggerated in the drawing. There is one of these blades for each of the bins formed in the trough by the partition members 17 and since the blades are all similarly mounted on bar 27 they reciprocate in unison when the bar 27 is reciprocated. Means are provided to reciprocate the bar 27 and as shown in Figs. 1 to 4 comprises a lever 30 fixedly connected by a clamp member 31 to the bar 27, said lever extending upwardly therefrom parallel with the exterior of side wall 11, and being guided at its upper portion by a sleeve 32 slidably mounted on a cross bar 33, the ends of the latter being securely mounted in brackets 34 at each end thereof. The lever 30 is provided at its longitudinal central portion and also at its upper end portion with handles 35 by which the lever may be reciprocated longitudinally of the trough and thereby reciprocate the bar 27 and the blades 29 which are mounted thereon.

The spreader of this invention is intended for relatively large areas of ground and in the operation thereof it is desirable, both because of the size and weight of the spreader and the material therein and because of the speed of operation, to mount the same upon the rear end of a vehicle, such as an automobile truck or a trailer or any type of traction unit. The rear end of the traction unit is conventionally shown in the drawing as at 36 and the framework is mounted thereon by means of bolts 37, said framework consisting of a sill 38, a strut 39, and a brace 40. At the outer or rear end of the frame is a support member 41 preferably inclined to the vertical to the same extent that a side wall of the trough is so inclined. It is to be understood that there is one of these frames on each side of the traction unit 36 so that the trough has at least two of such supports. Additional braces may be employed to further stabilize the trough in its mounting, but since such additional braces might assume many different forms and are within the skill of the ordinary mechanic, it is not believed necessary to further illustrate or describe them.

The trough is attached to these supports by means of bolt members 42 passing through the support 41 and the side wall 11 of the trough. It is to be understood that the angle of inclination of the side walls of the trough relative to a vertical center line thereof is an angle of gravitational slippage for the material to be employed therein, and it has been found from experiments that an angle of approximately fifty-five degrees is satisfactory and efficient, though it is not intended to limit the invention to that specific angle.

Referring to the modification in Fig. 5, the trough 10, side walls 11, 12, and partition members 17 and gate 19 may be identical with the structure illustrated in Figs. 1 to 4. The modification of Fig. 5 is in the assembly of the blades 29 and their means of reciprocation. In Fig. 5 the reciprocable bar 27 is mounted on top and substantially centrally of the partitions 17 and is slidable in the guides 43, the bar 27 being manually manipulable by handle member 44 fixedly connected thereto and extending therefrom. The blades 29 are also fixedly connected to the bar 27 and depend downwardly therefrom and into the lower apex at the bottom of the trough. The trough of Fig. 5 is adapted for mounting to the rear end of a vehicle unit in the same manner as shown in Fig. 3.

It is believed with the foregoing description in connection with the drawing, that the operation of the device is self-explanatory. Having mounted the trough upon its supporting frame on the vehicle 36, it may be transported over the field to be fertilized and the gate 19 may be adjusted to make the opening 18 of any predetermined width so as to spread the fertilizer uniformly over the entire area, or by readjusting the gate 19 to permit a greater or less flow of the fertilizer through the opening 18, the spread of fertilizer may be accurately guaged so that it may be spread more plentifully in one location than in another. The vibration of the vehicle will ordinarily be sufficient to cause the fertilizer to readily flow by gravity due to the angle of slippage of the side walls of the trough, but if the fertilizer should become lumpy or should pack, it can be readily loosened or lumps thereof crushed by means of the blades 29 and their reciprocation through rod 27 and the manual manipulation of the handles connected to said rod. If the terrain is on a slant from the horizontal, the partitions 17 forming the several bins in the trough prevent the fertilizer material from being jolted or vibrated to one end of the trough and thereby leaving the other end of the trough empty. In this manner, an even spread of material is obtained even when the device is operated on relatively steep hillsides.

I claim:

1. A spreader for pulverized material adapted for mounting on a supporting frame of a vehicle, said spreader comprising an elongated generally V-shaped trough for receiving the materials to be spread, laterally transverse partitions relatively spaced longitudinally in said trough and dividing it into relatively separate independent bins, said trough having a hinged adjustable gate providing an elongated opening at its bottom portion, means including a tensioned spring having bearing on one side of the gate and a stop member on the opposite side for adjusting the said gate whereby the lateral width of said opening may be varied and set at predetermined positions, a blade for each of said bins adapted for entering said elongated opening and for reciprocation therein, and means for reciprocating said blades in unison, the said partitions extending downwardly into the narrowed bottom of the trough adjacent the elongated opening so that the material in one bin will not flow in substantial quantities into an adjoining bin by vibration, tilt, or movement of the blades.

2. A spreader for pulverized material adapted for mounting on a supporting frame of a vehicle, said spreader comprising an elongated trough having downwardly converging longitudinal side walls and adapted for receiving the materials to be spread, laterally transverse partitions relatively spaced longitudinally in said trough and dividing it into relatively separate independent bins, said trough having a hinged adjustable gate forming a lower terminal portion of one side wall and providing an elongated opening at the bottom portion thereof, means including a tensioned spring having bearing on one side of the gate and a stop member on the opposite side for adjusting the said gate whereby the lateral width of said opening may be varied and set at predetermined positions, a blade for each of said bins adapted for entering said elongated opening and for reciprocation therein, means for reciprocating said blades in unison, said last mentioned means including a reciprocable bar on which said blades are fixedly mounted, the said partition extending downwardly into the narrowed bottom of the trough adjacent the elongated opening so that the material in one bin will not flow in substantial quantities into an adjoining bin by vibration, tilt, or movement of the blades.

JACK D. ROSSI.